United States Patent Office 3,595,921
Patented July 27, 1971

3,595,921
REDUCING THE COLOR CONTENT OF POLY-
ETHYLENE POLYAMINES PREPARED BY THE
REACTION OF AMMONIA WITH ETHYLENE
DICHLORIDE
James William Pitts, Port Neches, Tex., assignor to Jefferson Chemical Company, Inc., Houston, Tex.
No Drawing. Filed June 16, 1969, Ser. No. 833,802
Int. Cl. C07c 85/16
U.S. Cl. 260—583
6 Claims

ABSTRACT OF THE DISCLOSURE

The color content of the polyethylene polyamine products prepared by the reaction of ethylene dichloride with ammonia is reduced by refluxing the product in the presence of at least about 0.5 wt. percent potassium hydroxide for at least one hour at a temperature of about 110° to about 190° C. at the reduced pressure corresponding to the refluxing temperature and recovering the polyethylene polyamine product having a substantially reduced color content from the refluxing mixture.

BACKGROUND OF THE INVENTION

Polyethylene polyamine products are produced in the reaction of ethylene dichloride with ammonia. In this process many valuable products are produced such as ethylenediamine, piperazine, aminoethylpiperazine, diethylenetriamine, triethylenetetramine, tetraethylenepentamine, etc.

In the reaction, ethylene dichloride is reacted with an excess of ammonia to provide a reaction product comprising amine hydrochlorides which are then neutralized with a base such as sodium hydroxide to produce the above amine products, which are recovered through a series of separations by distillation. Processes for reacting the ethylene dichloride with ammonia are well known and are described in U.S. Pats. 2,049,467 and 2,769,841, for example. Another such process is described in U.S. Pat. 3,394,186, for example. While this latter patent is specifically directed to the manufacture of anhydrous ethylenediamine, the higher polyethylene polyamine products are also produced. These higher polyethylene polyamine products are recovered by a series of fractional distillations. However, it has been discovered that the polyethylene polyamine products produced thereby have undesirable coloring bodies therein which are removed only with great difficulty if removal at all is possible.

Heretofore, it has been attempted to remove the coloring bodies from polyethylene polyamines such as triethylenetetramine, tetraethylenepentamine, pentaethylenehexamine, etc., without any degree of success.

Methods such as careful fractional distillation of the product have little effect on the color content of the product. Various techniques for reducing the color have been tried without success such as treating with activated carbon, with sodium borohydride, with a mixture of calcium hypochlorite and calcium hydroxide, and hydrochloric acid or oxidation of the impurities with potassium dichromate. All of these attempts have failed to reduce the color content of the polyethylene polyamine products.

With respect to product quality, it is desired to have a color rating of less than about 100 on the platinum cobalt scale for triethylenetetramine, for example. The color requirement for the higher polyethylene polyamine is not as severe.

Accordingly, it is the object of my invention to reduce the color content of polyethylene polyamines prepared by the reaction of ethylene dichloride with ammonia.

Other objects and advantages of my invention will be apparent from the following description.

SUMMARY OF THE INVENTION

My invention relates to a method for reducing the color of polyethylene polyamine products prepared by the reaction of ethylene dichloride with ammonia by mixing at least about 0.5 wt. percent potassium hydroxide with the polyethylene polyamine product and refluxing the mixture at a temperature of about 110° to about 190° C. at a reduced pressure corresponding to the refluxing temperature for at least one hour and recovering the polyamine product from said mixture. I have discovered that by using this method polyethylene polyamine products can be recovered having substantially lower color content than those heretofore produced and recovered using known processing techniques.

DESCRIPTION OF THE INVENTION

The polyethylene polyamine products treated in the practice of my invention are produced by the reaction of ethylene dichloride with ammonia in well known processes. Valuable products are produced such as ethylenediamine, piperazine, diethylenetriamine, aminoethylpiperazine and other polyethylene polyamine products such as triethylenetetramine, tetraethylenepentamine, pentaethylenehexamine, etc. The practice of my invention improves the color of diethylenetriamine somewhat, but has its primary application in improving the color of the polyethylene polyamine products having from three to five ethylene groups and from four to six amino groups therein; i.e., triethylenetetramine, tetraethylenepentamine and pentaethylenehexamine.

In the method of my invention the treating agent is potassium hydroxide. It may be added to the colored polyethylene polyamine products in either its solid form, in aqueous solution or dissolved in methanol. I have found that adding the potassium hydroxide in any of the above forms gives satisfactory performance in reducing the color of the polyethylene polyamine products.

The potassium hydroxide is added in an amount such that at least about 0.5 wt. percent of potassium hydroxide is present based upon the polyethylene polyamine products treated. I have found that a practical upper limit is about 3 wt. percent. However, greater amounts can be added but they only tend to add more expense to the treatment and do little, if any, good as far as a practical further reduction of the color of the material is concerned. In certain cases, it may even be possible to add less than 0.5 wt. percent KOH but I have found that this amount is sufficient for practical economical operation of a production unit or batch treatment process, whichever is involved.

Generally, in the operation of the production unit wherein the polyethylene polyamines are produced the higher polyethylene polyamine products such as triethylenetetramine, tetraethylenepentamine, pentaethylenehexamine, etc., have a color rating of about six to eight on the Gardner color scale. When at least about 0.5 wt. percent KOH is added to this product, the color of these polyethylene polyamine products is greatly reduced. For example, the treatment of my invention lowers the color of triethylenetetramine from above a Gardner 8 to about a platinum-cobalt color of about 50. It can be seen from this that the practice of my invention drastically reduces the color content of the polyethylene polyamines produced in the reaction of ethylene dichloride with ammonia.

In the practice of my invention, the potassium hydroxide is mixed with the polyethylene polyamines and refluxed for at least about one hour at a temperature of about 110° to about 190° C. with the preferable range being between about 140° C. and about 160° C. at a reduced pressure corresponding to these temperatures. It is preferred to carry on the refluxing for a period of about two hours; however, a greater time can be used but the improvement gained thereby is relatively insignificant. The preferred refluxing time in the practice of my invention is from about two to about five hours. This has been found to sufficiently reduce the coloring bodies in the polyethylene polyamine products to desirable levels.

During the refluxing step low boiling degradation products formed by the reaction of the KOH with the color bearing impurities must be removed in order to achieve the desired result. When the method of my invention is used in a batch treatment, the removal of the degradation products is accomplished by applying sufficient vacuum on the column and condensing these degradation products so that they are not returned to the column in the reflux stream. When the method is used in a continuous operation and injected into the process prior to the distillation towers wherein the polyethylene polyamine products are removed, the degradation products are removed with lighter amine products and, hence, allow the successful accomplishment of the objectives of my invention.

In performing the process of my invention the high color polyethylene polyamine product may be treated in a batch process or the treatment of my invention may be directly injected into the product recovery system of a plant producing these products from ethylene dichloride and ammonia.

In the batch operation the highly colored polyethylene polyamine product such as a triethylenetetramine product, for example, is mixed with the potassium hydroxide in the amounts as described above and refluxed as described above, with removal of the low boiling degradation products, for at least about one hour. Then the low colored product can be recovered by a distillation from the residues formed.

As was described above, the polyethylene polyamine products are produced by the reaction of ethylene dichloride with ammonia. This reaction forms an ethylene amine hydrochloride solution which is neutralized with sodium hydroxide, for example, to form a salt which is removed and the amine products which are later recovered. This material is then dewatered and proceeds through a series of fractionating columns to recover the various products produced in the reaction. These products are removed in the ascending order of their boiling points; such as, for example, ethylenediamine is removed over a distillation range followed by piperazine, diethylenetriamine, aminoethylpiperazine and the higher polyethylene polyamine products such as triethylenetetramine, tetraethylenepentamine and pentaethylenehexamine, are recovered by distillation in their respective temperature ranges, leaving heavier amine products and a residue. In order to recover, for example, lighter colored triethylenetetramine or tetraethylenepentamine products, the potassium hydroxide would be injected into the bottoms of one of the previous product recovery towers. For example, it may well be preferable to inject the potassium hydroxide into the bottoms stream of the column from which ethylenediamine is recovered as a product. This would allow the potassium hydroxide to be present during the subsequent recovery of piperazine, diethylenetriamine and aminoethylpiperazine fractions, which would provide the necessary reflux time and removal of degradation products as mentioned above for the batch operation. Then, when the triethylenetetramine products or tetraethylenepentamine products are recovered the low color product would result since the treating agent of my invention has remained in the system for a sufficient period of time. Therefore, it is readily seen how the treatment of my invention is equally applicable to batch decolorization of the polyethylene polyamine products, or incorporation into the process wherein polyethylene polyamine products having greatly reduced color contents will be produced.

My invention will be further illustrated by the following examples which are offered for purposes of illustration and should not be construed to limit the scope of my invention.

EXAMPLE I

Triethylenetetramine was produced by the reaction of ammonia and ethylene dichloride in the usual manner and after removing ethylenediamine and other amines boiling at lower temperatures than the triethylenetetramine this product was also recovered by distillation. It had a color exceeding a Gardner 8. To the triethylenetetramine product was added 1% by wt. of solid potassium hydroxide. The product thus treated was refluxed four hours under reduced pressure and at 150° C. taking a small amount of light condensate overhead in a cold trap. The triethylenetetramine product was then recovered by a simple flash distillation. It had a color of 50 on the platinum-cobalt scale.

EXAMPLE II

The triethylenetetramine product as described in the Example I was treated in the manner of Example I with 0.5 wt. percent potassium hydroxide which was dissolved in methanol. The recovered triethylenetetramine product had a color rating on the platinum cobalt scale of 70.

EXAMPLE III

This example illustrates the necessity of removing the low boiling degradation products to successfully practice my invention. Triethylenetetramine product of Example I was mixed with 1 wt. percent solid potassium hydroxide in a stainless steel kettle. The mixture was stirred for two hours at 150° C. under a nitrogen pad of slightly greater than atmospheric pressure. The mixture was then flashed at minimum pressure using a laboratory wiped film evaporator. The color of the triethylenetetramine product recovered was approximately the same as the Gardner 8+ initially.

EXAMPLE IV

Example III was rerun except that the kettle was equipped with a reflux condenser and a vacuum pump downstream of two Dry Ice-acetone traps. With sufficient vacuum to barely reflux the mixture at 150° C., the mixture was stirred for two hours. The mixture was then flashed as in Example III and the color of the triethylenetetramine product recovered was about 70 platinum cobalt.

EXAMPLE V

This example is a laboratory illustration of the use of this treament in a continuous process. A sample of the bottoms from the ethylenediamine recovery tower was charged to a round bottom flask to which 1 wt. percent KOH (aqueous) was added. The mixture was flashed at eight to twelve millimeters mercury pressure and a final pot temperature of 111° to 115° C. over a period of about two hours to remove the diethylenetriamine, piperazine and aminoethylpiperazine present. The residue was then charged to a batch fractionating column packed with 12 inches of 316 stainless steel Goodloe packing and distilled at five to seven millimeters pressure to recover the triethylenetetramine product at 130° to 140° C. The color of the recovered triethylenetetramine product was a platinum-cobalt 70.

In practicing my invention in a continuous process it is preferable to use aqueous KOH for ease of handling. The water added, of course, would be removed in the distillations removing lower boiling amine products of the reaction of ethylene dichloride with ammonia.

From the above description of my invention it will be obvious to those skilled in the art to make many modifications and variations of the practice of my invention. It is my intention that these obvious modifications and variations are within the scope and spirit of my invention.

What is claimed is:

1. A method for reducing the color of polyethylene polyamine products prepared by the reaction of ethylene dichloride with ammonia, which comprises the steps of: (1) mixing at least about 0.5 wt. percent of potassium hydroxide with the polyethylene polyamine product; (2) refluxing said mixture for at least one hour at a temperature of about 110° to about 190° C. and a reduced pressure corresponding to the refluxing temperature while removing low boiling degradation products; and (3) recovering the polyethylene polyamine product from said mixture.

2. The method of claim 1 wherein the polyethylene polyamine products are triethylenetetramine, tetraethylenepentamine and pentaethylenehexamine.

3. The method of claim 2 wherein the polyethylene polyamine product treated is triethylenetetramine.

4. The method of claim 1 wherein the potassium hydroxide is added in the amount of from about 0.5 wt. percent to about 3 wt. percent.

5. The method of claim 1 wherein the mixture is refluxed at about 130° C. to about 160° C. for two to five hours.

6. The method of claim 1 wherein the process for producing the polyethylene polyamine products is a continuous process and the potassium hydroxide is aqueous potassium hydroxide introduced in said process prior to the recovery of triethylenetetramine products.

References Cited
UNITED STATES PATENTS

| | | | |
|---|---|---|---|
| 2,049,467 | 8/1936 | Mnookin | 260—585(A) |
| 2,769,841 | 11/1956 | Dylewski et al. | 260—585(A) |
| 3,394,186 | 7/1968 | Muhlbauer | 260—583(N) |
| 3,448,152 | 6/1969 | Milligan | 260—583(N) |

CHARLES B. PARKER, Primary Examiner

R. L. RAYMOND, Assistant Examiner

U.S. Cl. X.R.

260—268, 585A